(12) United States Patent
Horst et al.

(10) Patent No.: US 7,811,189 B2
(45) Date of Patent: Oct. 12, 2010

(54) DEFLECTOR ASSEMBLY

(75) Inventors: Robert W. Horst, San Jose, CA (US); Richard R. Marcus, Mountain View, CA (US)

(73) Assignee: Tibion Corporation, Sunnyvale, CA (US)

( * ) Notice: Subject to any disclaimer, the term of this patent is extended or adjusted under 35 U.S.C. 154(b) by 236 days.

(21) Appl. No.: 11/649,690

(22) Filed: Jan. 3, 2007

(65) Prior Publication Data

US 2007/0155557 A1   Jul. 5, 2007

Related U.S. Application Data

(60) Provisional application No. 60/755,466, filed on Dec. 30, 2005.

(51) Int. Cl.
*B65G 43/02* (2006.01)
*B65H 5/02* (2006.01)
*F16H 7/18* (2006.01)

(52) U.S. Cl. .............. 474/117; 74/53; 74/54; 74/55

(58) Field of Classification Search ............ 74/501.5 R, 74/53–59, 567–569; 248/621; 474/117, 474/118, 5–6; 56/11.1, 17.7, 16.7, 32.1
See application file for complete search history.

(56) References Cited

U.S. PATENT DOCUMENTS

| | | | | |
|---|---|---|---|---|
| 1,286,482 A | * | 12/1918 | Yoder | 474/135 |
| 1,366,904 A | * | 2/1921 | Davis | 474/117 |
| 1,391,290 A | * | 9/1921 | Welffens | 474/58 |
| 1,513,473 A | * | 10/1924 | Ackerman | 474/135 |
| 1,739,053 A | | 12/1929 | Wilhelm | |
| 1,847,720 A | * | 3/1932 | Wood | 474/133 |
| 2,169,813 A | * | 8/1939 | Parkin | 74/501.5 R |
| 3,059,490 A | * | 10/1962 | McDuffie | 474/133 |
| 3,200,666 A | | 8/1965 | Schrodt et al. | |
| 3,358,678 A | | 12/1967 | Kultsar | |
| 3,398,248 A | * | 8/1968 | Klauss | 200/574 |
| 3,402,942 A | | 9/1968 | Shimano et al. | |
| 3,631,542 A | | 1/1972 | Potter | |

(Continued)

FOREIGN PATENT DOCUMENTS

EP   1138286 A2   10/2001

(Continued)

OTHER PUBLICATIONS

Advanced Mechatronics Lab (Univ. of Tokyo); Dual Excitation Multiphase Electrostatic Drive (DEMED); http://www.intellect.pe.u-tokyo.ac.jp/research/es_motor/demed_e.html; pp. 1-5; (printed) Nov. 21, 2002.

(Continued)

*Primary Examiner*—Robert A Siconolfi
*Assistant Examiner*—Stephen Bowes
(74) *Attorney, Agent, or Firm*—Shay Glenn LLP

(57) ABSTRACT

A technique for deflecting an actuator belt includes applying a variable deflection force to the actuator belt. The technique may be used to construct actuators for active orthotics, robotics or other applications. Versions with passive clutches may also be used to construct variable-ratio motor gearheads, or may be scaled up to build continuously variable transmissions for automobiles, bicycles, or other vehicles.

9 Claims, 13 Drawing Sheets

High gear position, maximum deflection position of cam

U.S. PATENT DOCUMENTS

| | | | |
|---|---|---|---|
| 3,641,843 A | 2/1972 | Lemmens | |
| 3,863,512 A | 2/1975 | Crawley | |
| 3,899,383 A | 8/1975 | Schultz et al. | |
| 3,925,131 A | 12/1975 | Krause | |
| 4,507,104 A | 3/1985 | Clark et al. | |
| 4,549,555 A | 10/1985 | Fraser et al. | |
| 4,588,040 A | 5/1986 | Albright, Jr. et al. | |
| 4,649,488 A * | 3/1987 | Osanai et al. | 701/60 |
| 4,678,354 A * | 7/1987 | Olsen | 400/335 |
| 4,691,694 A | 9/1987 | Boyd et al. | |
| 4,697,808 A | 10/1987 | Larson et al. | |
| 4,731,044 A | 3/1988 | Mott | |
| 4,754,185 A | 6/1988 | Gabriel et al. | |
| 4,807,874 A | 2/1989 | Little | |
| 4,878,663 A | 11/1989 | Luquette | |
| 4,883,445 A * | 11/1989 | Gomoll et al. | 474/113 |
| 4,922,925 A | 5/1990 | Crandall et al. | |
| 4,934,694 A | 6/1990 | McIntosh | |
| 4,944,713 A | 7/1990 | Salerno | |
| 4,953,543 A | 9/1990 | Grim et al. | |
| 4,981,116 A | 1/1991 | Trinquard | |
| 4,983,146 A * | 1/1991 | Charles et al. | 474/117 |
| 5,052,681 A | 10/1991 | Williams | |
| 5,078,152 A | 1/1992 | Bond et al. | |
| 5,170,777 A | 12/1992 | Reddy et al. | |
| 5,195,617 A * | 3/1993 | Clemens | 188/71.8 |
| 5,203,321 A | 4/1993 | Donovan et al. | |
| 5,209,223 A | 5/1993 | McGorry et al. | |
| 5,239,222 A | 8/1993 | Higuchi et al. | |
| 5,241,952 A | 9/1993 | Ortiz | |
| 5,282,460 A | 2/1994 | Boldt | |
| 5,303,716 A | 4/1994 | Mason et al. | |
| 5,313,968 A | 5/1994 | Logan et al. | |
| 5,345,834 A | 9/1994 | Hayashi | |
| 5,358,468 A | 10/1994 | Longo et al. | |
| 5,378,954 A | 1/1995 | Higuchi et al. | |
| 5,421,798 A | 6/1995 | Bond et al. | |
| 5,440,945 A | 8/1995 | Penn | |
| 5,448,124 A | 9/1995 | Higuchi et al. | |
| 5,463,526 A | 10/1995 | Mundt | |
| 5,476,441 A | 12/1995 | Durfee et al. | |
| 5,509,894 A | 4/1996 | Mason et al. | |
| 5,520,627 A | 5/1996 | Malewicz | |
| 5,525,642 A | 6/1996 | Cipriano et al. | |
| 5,534,740 A | 7/1996 | Higuchi et al. | |
| 5,541,465 A | 7/1996 | Higuchi et al. | |
| 5,582,579 A | 12/1996 | Chism et al. | |
| 5,585,683 A | 12/1996 | Higuchi et al. | |
| 5,624,390 A | 4/1997 | Van Dyne | |
| 5,653,680 A | 8/1997 | Cruz | |
| 5,662,594 A | 9/1997 | Rosenblatt | |
| 5,662,693 A | 9/1997 | Johnson et al. | |
| 5,674,262 A | 10/1997 | Tumey | |
| 5,683,351 A | 11/1997 | Kaiser et al. | |
| 5,704,440 A | 1/1998 | Urban et al. | |
| 5,708,319 A | 1/1998 | Ban et al. | |
| 5,728,017 A | 3/1998 | Bellio et al. | |
| 5,746,684 A | 5/1998 | Jordan | |
| 5,746,704 A | 5/1998 | Schenck et al. | |
| 5,755,303 A | 5/1998 | Yamamoto et al. | |
| 5,789,843 A | 8/1998 | Higuchi et al. | |
| 5,833,257 A | 11/1998 | Kohlheb et al. | |
| 5,865,770 A | 2/1999 | Schectman | |
| 5,916,689 A | 6/1999 | Collins et al. | |
| 5,931,756 A | 8/1999 | Ohsono et al. | |
| 6,001,075 A | 12/1999 | Clemens et al. | |
| 6,033,330 A * | 3/2000 | Wong et al. | 474/133 |
| 6,062,096 A | 5/2000 | Lester | |
| 6,119,539 A | 9/2000 | Papanicolaou | |
| 6,149,612 A | 11/2000 | Schnapp et al. | |
| 6,162,189 A | 12/2000 | Girone et al. | |
| 6,183,431 B1 | 2/2001 | Gach, Jr. | |
| 6,217,532 B1 | 4/2001 | Blanchard et al. | |
| 6,221,032 B1 | 4/2001 | Blanchard et al. | |
| 6,290,662 B1 | 9/2001 | Morris et al. | |
| 6,314,835 B1 | 11/2001 | Lascelles et al. | |
| 6,440,093 B1 | 8/2002 | McEwen et al. | |
| 6,472,795 B2 | 10/2002 | Hirose et al. | |
| 6,494,798 B1 | 12/2002 | Onogi | |
| 6,525,446 B1 | 2/2003 | Yasuda et al. | |
| 6,527,671 B2 | 3/2003 | Paalasmaa et al. | |
| 6,533,742 B1 | 3/2003 | Gach, Jr. | |
| 6,537,175 B1 | 3/2003 | Blood | |
| 6,554,773 B1 | 4/2003 | Masakov et al. | |
| 6,572,558 B2 | 6/2003 | Masakov et al. | |
| 6,599,255 B2 | 7/2003 | Zhang | |
| 6,659,910 B2 | 12/2003 | Gu et al. | |
| 6,694,833 B2 | 2/2004 | Hoehn et al. | |
| 6,709,411 B1 | 3/2004 | Olinger | |
| 6,805,677 B2 | 10/2004 | Simmons | |
| 6,821,262 B1 | 11/2004 | Muse et al. | |
| 6,827,579 B2 | 12/2004 | Burdea et al. | |
| 6,872,187 B1 | 3/2005 | Stark et al. | |
| 6,878,122 B2 | 4/2005 | Cordo | |
| 6,936,994 B1 | 8/2005 | Gimlan | |
| 6,966,882 B2 | 11/2005 | Horst | |
| 7,124,321 B2 | 10/2006 | Garnett et al. | |
| 7,192,401 B2 | 3/2007 | Saalasti et al. | |
| 7,239,065 B2 | 7/2007 | Horst | |
| 7,252,644 B2 | 8/2007 | Dewald et al. | |
| 7,324,841 B2 | 1/2008 | Reho et al. | |
| 7,365,463 B2 | 4/2008 | Horst et al. | |
| 7,537,573 B2 | 5/2009 | Horst | |
| 7,648,436 B2 | 1/2010 | Horst et al. | |
| 2001/0029343 A1 | 10/2001 | Seto et al. | |
| 2003/0104886 A1 | 6/2003 | Gajewski | |
| 2003/0120183 A1 | 6/2003 | Simmons | |
| 2004/0015112 A1 | 1/2004 | Salutterback et al. | |
| 2004/0054311 A1 | 3/2004 | Sterling | |
| 2004/0078091 A1 | 4/2004 | Elkins | |
| 2004/0106881 A1 | 6/2004 | McBean et al. | |
| 2005/0085346 A1 | 4/2005 | Johnson | |
| 2005/0085353 A1 | 4/2005 | Johnson | |
| 2005/0101887 A1 | 5/2005 | Stark et al. | |
| 2005/0151420 A1 | 7/2005 | Crombez et al. | |
| 2005/0210557 A1 | 9/2005 | Falconer | |
| 2005/0221926 A1 | 10/2005 | Naude | |
| 2005/0245849 A1 | 11/2005 | Cordo | |
| 2005/0273022 A1 | 12/2005 | Diaz et al. | |
| 2006/0004265 A1 | 1/2006 | Pulkkinen et al. | |
| 2006/0206045 A1 | 9/2006 | Townsend et al. | |
| 2006/0251179 A1 | 11/2006 | Ghoshal | |
| 2006/0293624 A1 | 12/2006 | Enzerink et al. | |
| 2007/0055163 A1 | 3/2007 | Asada et al. | |
| 2007/0155558 A1 | 7/2007 | Horst et al. | |
| 2007/0155560 A1 | 7/2007 | Horst et al. | |
| 2007/0162152 A1 | 7/2007 | Herr et al. | |
| 2007/0270265 A1 | 11/2007 | Miller et al. | |
| 2008/0039731 A1 | 2/2008 | McCombie et al. | |
| 2008/0195005 A1 | 8/2008 | Horst et al. | |
| 2009/0036804 A1 | 2/2009 | Horst | |
| 2009/0204038 A1 | 8/2009 | Smith et al. | |
| 2009/0306548 A1 | 12/2009 | Bhugra et al. | |
| 2010/0038983 A1 | 2/2010 | Bhugra et al. | |
| 2010/0039052 A1 | 2/2010 | Horst et al. | |

FOREIGN PATENT DOCUMENTS

| | | | |
|---|---|---|---|
| JP | 63-136978 A | | 6/1988 |
| JP | 02275162 A | * | 11/1990 |
| JP | 04104180 A | * | 4/1992 |
| JP | 05-260766 | | 10/1993 |
| JP | 06-038551 A | | 2/1994 |
| JP | 07-274540 A | | 10/1995 |

| | | |
|---|---|---|
| JP | 08-033360 A | 2/1996 |
| JP | 08-149858 | 6/1996 |
| JP | 08-154304 A | 6/1996 |
| JP | 09-261975 A | 10/1997 |
| WO | WO 90/11049 A1 | 10/1990 |
| WO | WO 2005/057054 A1 | 6/2005 |
| WO | WO 2007/027673 A2 | 3/2007 |
| WO | WO 2007/041303 A2 | 4/2007 |

OTHER PUBLICATIONS

Advanced Mechatronics Lab (Univ. of Tokyo); High-power electrostatic motor; http://www.intellect.pe.u-tokyo.ac.jp/research/es_motor/es_motor_e.html; pp. 1-2; (printed) Nov. 21, 2002.

Advanced Mechatronics Lab (Univ. of Tokyo); Pulse driven induction electrostatic motor; http://www.intellect.pe.u-tokyo.ac.jp/research/es_motor/pim_e.html; pp. 1-5; (printed) Nov. 21, 2002.

ASEL (Univ. of Delaware); Powered orthosis project; http://www.asel.udel.edu/robotics/orthosis/orthosis.html, 1 pg.; (update) Jan. 17, 1999.

British Tech. Group; Demonstration of energy saving in vehicles by integrating an infinitely variable transmission with an optimized petrol engine; prj. No. TR/00087/92; pp. 1-19; (version) Jul. 15, 1998.

Coronel et al; The Coronel effect positively infinitely variable transmission; U.C. Davis; No. 04CVT-51; pp. 1-8; 2004.

Fitch, C. J.; Development of the electrostatic clutch; IBM Journal; pp. 49-56; Jan. 1957.

Frank, Andrew; Engine optimization concepts for CVT-hybrid system to obtain the best performance and fuel efficiency; U.C. Davis; No. 04CVT-56; pp. 1-12; 2004.

Gongola et al.; Design of a PZT-actuated proportional drum brake; IEEE ASME Trans. on Mech.; vol. 4; No. 4; pp. 409-416; Dec. 1999.

Howard Leitch, PPT LTD.; Waveform Gearing; Motion System Design; pp. 33-35; Nov. 2002.

James et al.; Increasing power density in a full toroidal variator; 3rd Int'l. IIR-Symposium; Innovative Automotive Transmission; pp. 1-11; Dec. 2004.

Kawamoto et al.; Power assist system HAL-3 for GAIT disorder person; ICCHP 2002; LNCS 2398; pp. 196-203; 2002.

Kim et al.; On the energy efficiency of CVT-based mobile robots; Proc. 2000 IEEE; Int. Conf. on Robotics & Automation; pp. 1539-1544; San Francisco, CA; Apr. 2000.

Kluger et al.; An overview of current automatic, manual and continuously variable transmission efficiencies and their projected future improvements; Int. Congress and Expo. (No. 1999-1-1259); pp. 1-6; Detroit, MI; Mar. 1-4, 1999.

Misuraca et al.; Lower limb human enhancer; Int. Mech. Eng. Conf. and Expo.; New York, NY; pp. 1-7; Nov. 11-16, 2001.

Niino et al.; Electrostatic artificial muscle: compact, high-power linear actuators with multiple-layer structures; Proc. IEEE Workshop on Micro Electro Mechanical Systems; Oiso, Japan; pp. 130-135; Jan. 1994.

Nugent, James; Design and performance of an exponential roller gear continuously variable transmission with band clutches; U.C. Davis; No. 04CVT-18; pp. 1-8; 2004.

Otto Bock Health Care; (3C100 C-Leg® System) Creating a new standard for prosthetic control; http://www.ottobockus.com/products/op_lower_cleg.asp; pp. 1-2; (printed) Nov. 22, 2002.

Otto Bock Health Care; (3C100 C-Leg® System) New generation leg system revolutionizes lower limb prostheses; http://www.ottobockus.com/products/op_lower_cleg4.asp; pp. 1-2; (printed) Nov. 22, 2002.

Powell et al.; Computer model for a parallel hybrid electric vehicle (PHEV) with CVT; Proc. AACC; pp. 1011-1015; Chicago, IL; Jun. 2000.

Shastri et al.; Comparison of energy consumption and power losses of a conventionally controlled CVT with a servo-hydraulic controlled CVT and with a belt and chain as the torque transmitting element; U.C. Davis; No. 04CVT-55; pp. 1-11; 2004.

Shriner'S Hospitals; Your new orthosis; http://www.shrinershq.org/patientedu/orthosis.html; pp. 1-3; (printed) Nov. 22, 2002.

Takaki et al; Load-sensitive continuously variable transmission for powerful and inexpensive robot hands; IEEE; pp. 45-46; 2004.

Takesue et al.; Development and experiments of actuator using MR fluid; IEEE; pp. 1838-1843; 2000.

Townsend Design; Functional Knee Bracing Solutions; http://www.townsenddesign.com/functional.html; pp. 1; (printed) Nov. 21, 2002.

Townsend Design; Patented Motion Hinge (Planes of Motion); http://www.townsenddesign.com/motion.html; pp. 1; (printed) Nov. 21, 2002.

Trimmer et al.; An operational harmonic electrostatic motor; IEEE; pp. 13-16; 1989.

* cited by examiner

Slider Assembly of Complete Bi-Directional Linear Slider Assembly

Dual Deflection Assembly of Complete Bi-Directional Linear Slider Assembly

DEFLECTOR ASSEMBLY

CROSS REFERENCE TO RELATED APPLICATIONS

This Application claims the benefit of U.S. Provisional Application No. 60/755,466 filed Dec. 30, 2005, the disclosure of which is incorporated herein by reference.

BACKGROUND

Motors and actuators are used in a wide variety of applications. Many applications, including robotics and active orthotics, require characteristics similar to human muscles. The characteristics include the ability to deliver high torque at a relatively low speed and to allow free-movement when power is removed, thereby allowing a limb to swing freely during portions of the movement cycle. This may call for an actuator that can supply large forces at slow speeds and smaller forces at higher speeds, or a variable ratio transmission (VRT) between the primary driver input and the output of an actuator.

In the past, several different techniques have been used to construct a VRT. Some examples of implementations of VRTs include Continuously Variable Transmissions (CVTs) and Infinitely Variable Transmissions (IVTs). The underlying principle of most previous CVTs is to change the ratio of one or more gears by changing the diameter of the gear, changing the place where a belt rides on a conical pulley, or by coupling forces between rotating disks with the radius of the intersection point varying based on the desired ratio. Prior art CVTs have drawbacks in efficiency, complexity, maximum torque, and range of possible ratios.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for deflecting an actuator belt includes applying a variable amount of deflection to a pair of belts (including, e.g., chains). The deflection distance can be set in multiple ways. For example, deflection distance can vary in a load-dependent manner to reduce the displacement as the load increases as an element of an automatically adjusting VRT. As another example, the deflection distance can be set based on input from a control system or vehicle operator, for instance, to increase torque (via smaller displacements) when acceleration is desired or to reduce the input motor speed (via larger displacements) when better economy or high speed is desired. The technique may be used to construct actuators for active orthotics, robotics or other applications. Versions with passive clutches may also be used to construct variable-ratio motor gearheads, or may be scaled up to build continuously variable transmissions for automobiles, bicycles, or other vehicles.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1A:
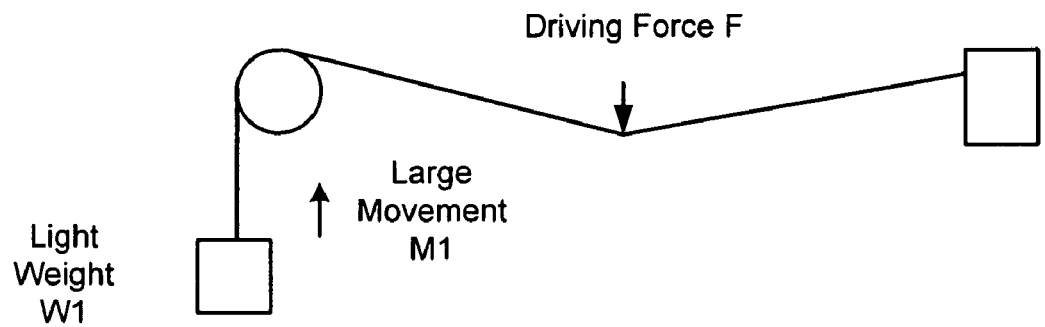
FIGS. 1A and 1B are diagrams illustrating a principle of operation.
Figure 1B:
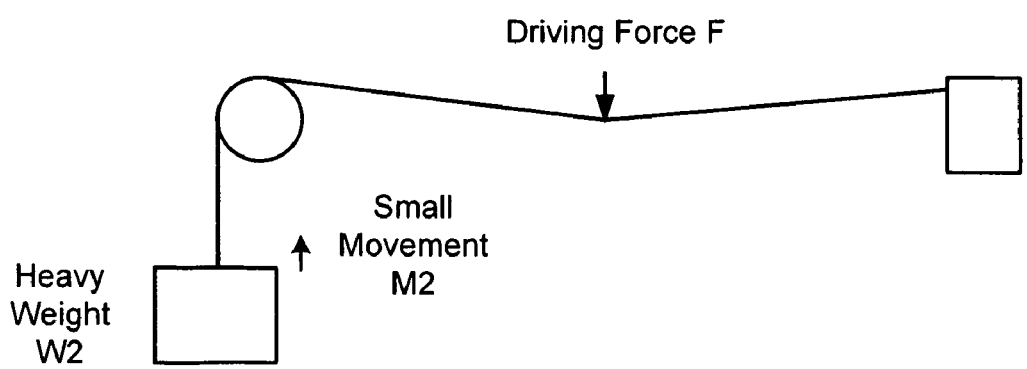

FIGS. 1A and 1B illustrate a principle of operation useful for an understanding of the teachings provided herein. FIGS. 1A and 1B show how a force can be used to deflect a belt and exert a strong force over a short distance or a weak force over a longer distance. FIG. 1A shows weight W1 attached to a rope that is anchored at one end and supported by a pulley. A force F deflects the rope near the middle and force F causes weight W1 to be lifted a distance M1. FIG. 1b shows that when the weight is replaced by a heavier weight W2, the same driving force F causes it to be lifted a smaller distance M2. Hence the rope has provided a variable transmission between the driving force F and the resisting force applied by the weight. By constructing a device that allows for multiple sequential deflections of a flexible belt, this principle can be used to construct a variety of actuators and transmissions.

U.S. patent application Ser. No. 11/033,368, which was filed on Jan. 13, 2005, and which is incorporated by reference, describes a high torque "pinch" motor with a variable ratio coupling between a driver and output. The motor includes a flexible disk or belt that couples a braking pulley and an output pulley. The output is alternately advanced or held in place while the driver returns to the position where it can again deflect the belt or disk to advance the output. However, the design does not allow for continuous output torque.

U.S. patent application Ser. No. 11,649,403 entitled "Rotary Actuator" by Horst et al. filed concurrently herewith is incorporated by reference. U.S. patent application Ser. No. 11,649,493 entitled "Linear Actuator" by Horst et al. filed concurrently herewith is incorporated by reference. U.S. patent application Ser. No. 11,649,496 entitled "Continuously Variable Transmission" by Horst et al. filed concurrently herewith is incorporated by reference.

Figure 2:
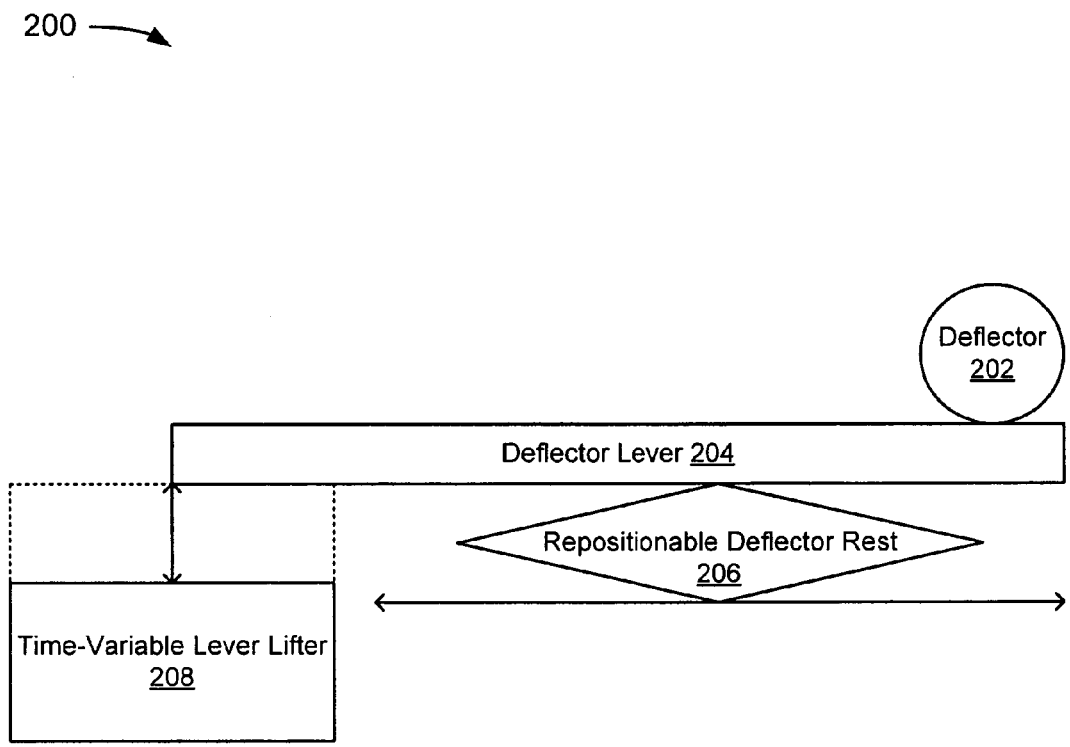
FIG. 2 depicts a conceptual example of a deflector system.

FIG. 2 depicts a conceptual example of a deflector system 200. The system 200 includes a deflector 202, a deflector lever 204, a repositionable deflector rest 206, and a time-variable lever lifter 208. The deflector 202 may include any component that directly deflects an actuator belt. Although the deflector 202 physically touches the actuator belt in a specific embodiment, the deflector 202 could make use of, for example, magnetism, to deflect the actuator belt. Any applicable known or convenient component may be used in this manner.

The deflector lever 204 is capable of directing the deflector 202 toward an actuator belt. The deflector lever 204 could have practically any shape, though a rod-shaped deflector lever is used in a specific implementation. The shape could vary dependent upon functional requirements such as available space, or for non-functional reasons, such as aesthetics.

The repositionable deflector rest 206 is juxtaposed with the deflector lever 204 at a juxtaposition point. The arrow under the repositionable deflector rest 206 conceptually illustrates that the juxtaposition point could be moved along the deflector lever 204. The deflector 202 deflects the actuator belt that moves the load to a degree that is at least partially depending upon the position of the juxtaposition point during at least a portion of the increasing deflection period.

The time-variable lever lifter 208 is coupled to the deflector lever 204. The time-variable lever lifter 208 lifts the deflector lever 204 by an amount that varies with time. This is illustrated by the dotted box with an arrow that is connected to the time-variable lever lifter 208 in the example of FIG. 2. Although the time-variable lever lifter 208 and the repositionable deflector rest 206 do not appear to be connected to one another in the example of FIG. 2, as will be seen in later examples, the repositionable deflector rest 206 may or may not be positioned between the deflector lever 204 and the time-variable lever lifter 208. The example of FIG. 2 is conceptual, and is not intended to illustrate actual component positions.

Figure 3A:
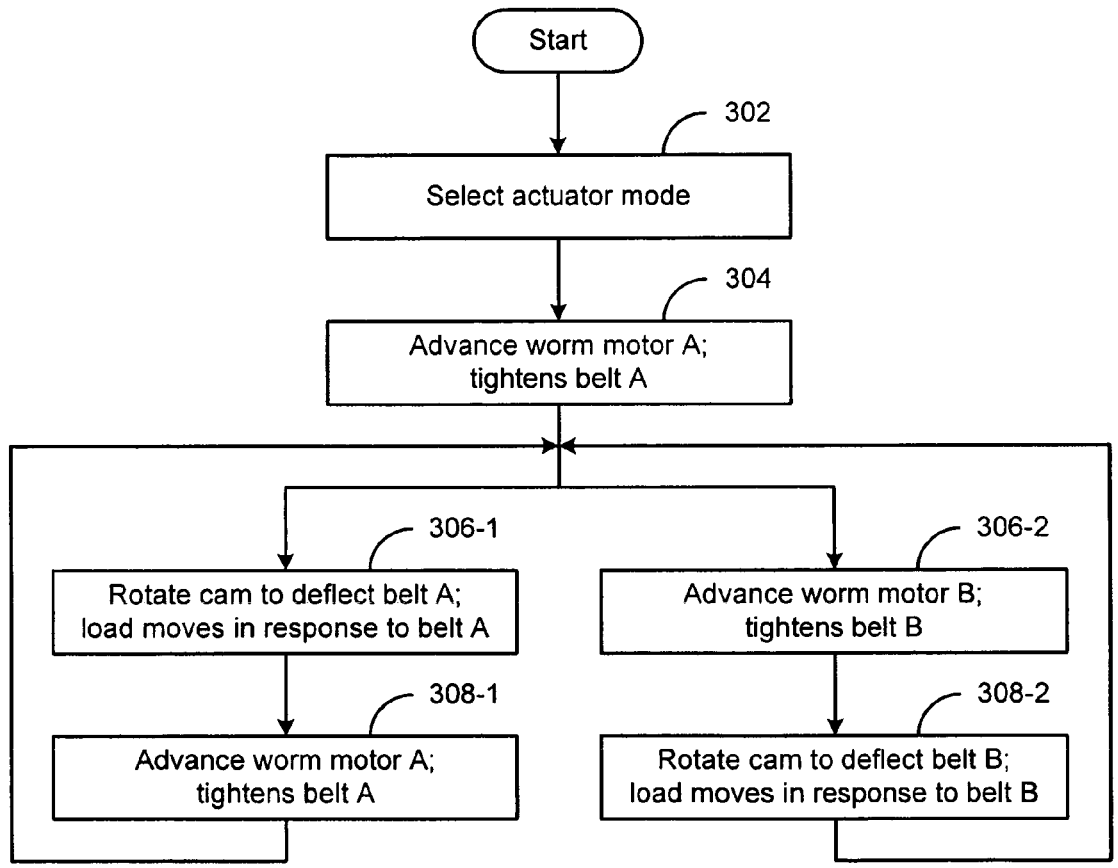
FIGS. 3A and 3B are flowcharts of methods for actuator-mode operation of a worm-braked actuator.

FIG. 3A is a flowchart 300A showing operation of a worm-braked device in actuator mode. This method and other methods are depicted as modules arranged serially or in parallel. However, modules of the methods may be reordered, or arranged for parallel or serial execution as appropriate. FIG. 3A is intended to illustrate an actuator mode of a continuous variable ratio motor.

In the example of FIG. 3A, the flowchart 300A starts at module 302 with selecting actuator mode. The flowchart 300A continues at module 304 with advancing worm motor A. Worm motor A may be either of dual (or more) worm motors that are part of a worm brake assembly of a continuously variable ratio actuator. The result of advancing worm motor A is that belt A is tightened. Belt A may be either of dual (or more) belts that are part of a continuously variable ratio actuator. It may be noted that the module 304 is optional in that if belt A is already tightened, the module 304 is not necessary to tighten belt A. The necessity of module 304, therefore, is dependent upon implementation and/or circumstances.

In the example of FIG. 3A, the flowchart 300A continues at modules 306-1 and 306-2, which are executed simultaneously. It may be noted that precise simultaneous execution may be impossible to achieve. Accordingly, "simultaneous" is intended to mean substantially simultaneous, or approximately simultaneous. Moreover, certain applications may require more or less accurate approximations of simultaneity. At module 306-1, a cam is rotated to deflect belt A. This has the result of moving a load in response to the deflection of belt A. At module 306-2, worm motor B is advanced to tighten belt B. Thus, the cam is rotated to deflect belt A while simultaneously tightening belt B.

In the example of FIG. 3A, the flowchart 300A continues at modules 308-1 and 308-2, which are executed simultaneously. At module 308-1, worm motor A is advanced to tighten belt A. At module 308-2, the cam is rotated to deflect belt B, and the load may be moved thereby. Thus, the cam is rotated to deflect belt B while simultaneously tightening belt A.

In the example of FIG. 3A, the flowchart 300A continues at the modules 306-1, 306-2, as described previously. In this way, continuous motion of the output is sustained. It should be noted that the flowchart 300A makes reference to a single cam, but that two cams could be used in alternative embodiments (e.g., a cam A and a cam B).

Figure 3B:
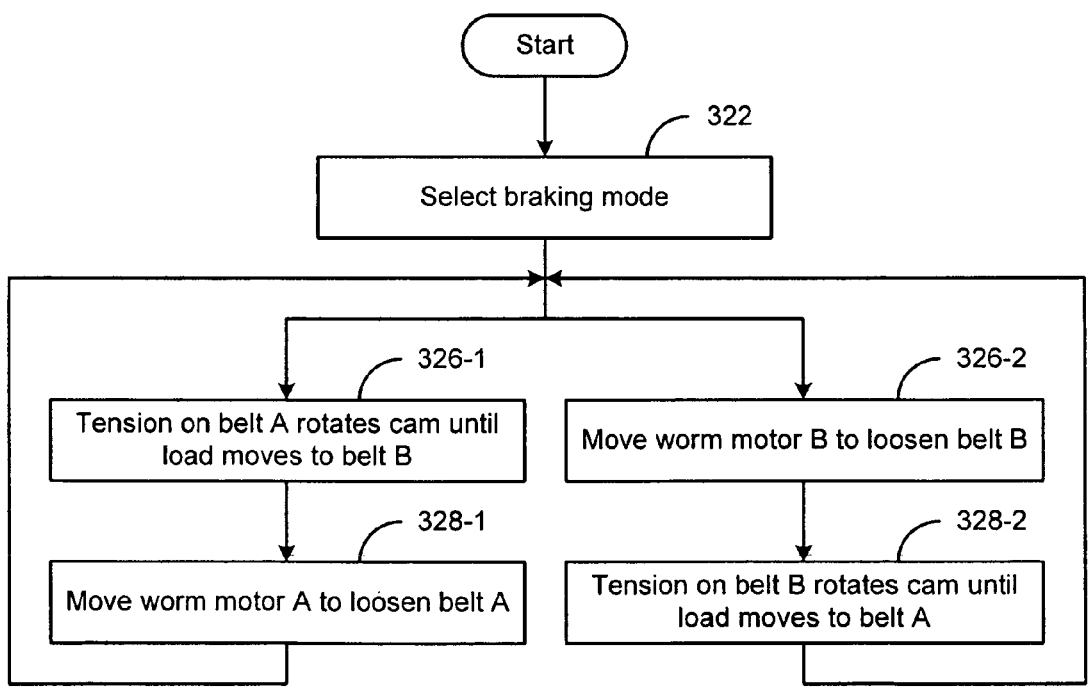

FIG. 3B is a flowchart 300B showing operation of a worm-braked device in braking mode. FIG. 3B is intended to illustrate a braking mode of a continuous variable ratio motor. It may be noted that in braking mode, the cam moves in the opposite direction to its motion in actuator mode. In the example of FIG. 3B, the flowchart 300B starts at module 322 with selecting braking mode.

In the example of FIG. 3B, the flowchart 300B continues at modules 326-1 and 326-2, which may be executed simultaneously. At the module 326-1, tension on belt A rotates a cam until a load moves to belt B. At the module 326-2, worm motor B is moved to loosen belt B. When an external force is applied, one of the belts becomes tight at the top or bottom, and that tension pulls against the cam to cause it to rotate. While that belt is supporting the load, the other worm motor loosens the other belt. The amount of loosening is chosen such that the load is passed from the first to the second belt before the first cam is rotated to its minimum displacement position.

In an embodiment, when the cam is being moved by the belt, energy can be recaptured by using the driver motor as a generator. Hence this mode can be used for regenerative braking or as a generator. In another embodiment, where the braking force is insufficient to rotate the cam, the cam motor can be controlled to force the appropriate rotation of the cam.

In the example of FIG. 3B, the flowchart 300B continues at modules 328-1 and 328-2, which may be executed simultaneously. At the module 328-1, worm motor A is moved to loosen belt A. At the module 328-2, tension on belt B rotates the cam until the load moves to belt A. The flowchart 300C then returns to the modules 326-1 and 326-2 to repeat the modules while in braking mode.

Figure 4:
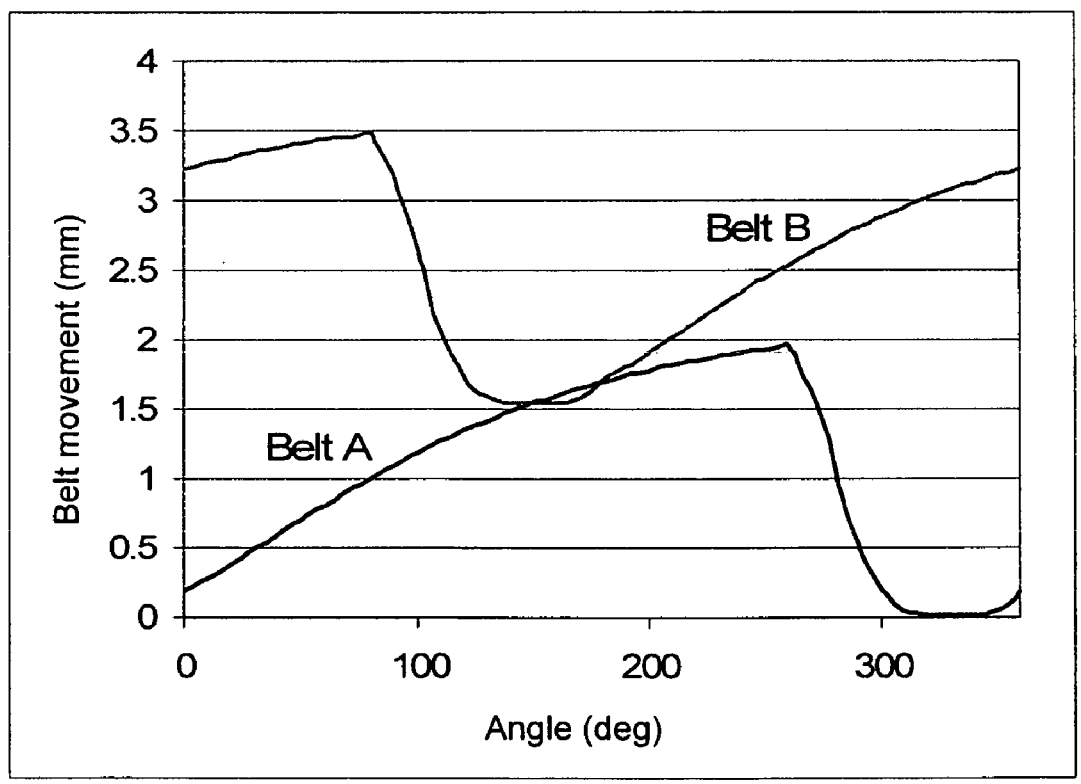
FIG. 4 is a graph illustrating continuous torque as tension is passed from one belt to another belt.

FIG. 4 shows a plot of the rotation angle of the two cams versus the change in belt length caused by the deflection of the belt. The output shaft movement in rotations is this belt deflection amount divided by the circumference of the output sprocket. FIG. 4 is plotted for a cam shape for which the radius increases quickly near its minimum radius, increases slowly as it approaches its maximum radius, then quickly decreases back to the minimum radius. This shape has an increasing radius for about 270 degrees and a decreasing radius for the other 90 degrees. By having the increasing radius more than 180 degrees, it is possible to have part of each cam rotation with the load shared between the two belts, allowing smooth operation with very little torque ripple.

The shape of the cam also allows for different drive ratios simply by adjusting the angle at which the cam touches and begins to deflect the belt. If the tensioner positions the belt to be tangent to the minimum radius of the cam, then the belt is deflected by the first 180 degrees of cam rotation. If the tensioner moves the belt support such that it contacts the cam only when it reaches 90 degrees of rotation, then the cam deflects the belt between 90 and 270 degrees. With this cam design, the radius delta of the cam between 0 and 180 degrees is greater than between 90 and 270 degrees, hence the belt is deflected less and movement of the tension has the effect of reducing the output speed, effectively dropping into a lower gear.

FIG. 4 also shows that this cam design has a large region where each degree of cam rotation results in a nearly linear change in belt displacement. This shows that the output torque will be nearly constant and independent of cam position. The graph for belt B has been displaced by the amount that belt A would have moved the output load. Note that near the points where the two graphs intersect, the slope of the belt A line is less than that of belt B, hence belt B is accelerating to catch up and take over the load from belt A.

In braking mode, the cam moves the opposite direction, so it is like viewing FIG. 4 from right to left. The load starts out on belt B, but near the points where the two graphs intersect, belt A has a radius changing more slowly than belt B, so its support of the load drops off faster and the load is transferred to belt A.

Figure 5:
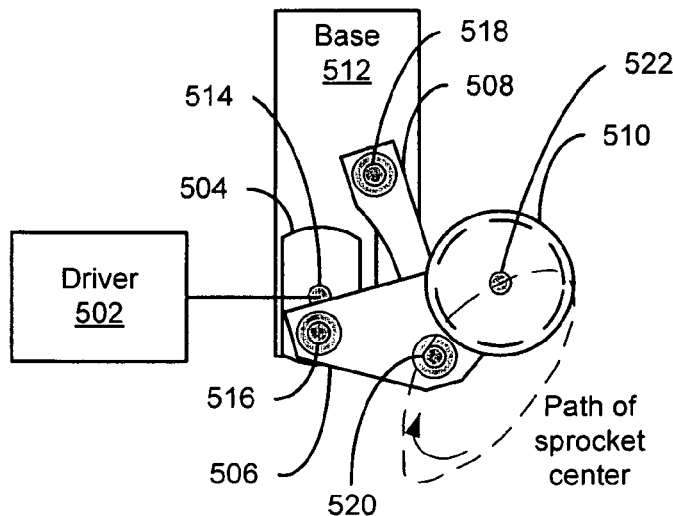
FIG. 5 shows an example of a device to deflect an actuator belt.

FIG. 5 shows an example of a device 500 to deflect an actuator belt. The device 500 includes a driver 502, a plate 504, a plate 506, a rocker arm 508, and a sprocket 510. For illustrative purposes, a base 512 is also depicted. The driver 502 may include any applicable device that is capable of rotating the plate 504. In the example of FIG. 5, the driver 502 is depicted, conceptually, as coupled to a rotation point 514. In some implementations, the driver 502 would appear to be behind the base 512 (where FIG. 1 represents a front view). In some implementations, the driver 502 is affixed to the base 512.

In the example of FIG. 5, the driver 502 is coupled to the rotation point 514, to which the plate 504 is also coupled. Thus, in operation, when the driver 502 rotates the rotation point 514, the plate 504 is also rotated.

In the example of FIG. 5, the plate 504 is coupled to the plate 506 at a pivot point 516. In order for the plate 506 to properly pivot at the pivot point 516, the pivot point 516 should have some radial distance from the rotation point 514.

In the example of FIG. 5, the rocker arm 508 is coupled to the base 512 at a pivot point 518, and to the plate 506 at a pivot point 520. Since the rotation point 514 and the pivot point 518 are fixed relative to one another, the rocker arm 508 rocks back and forth around the pivot point 520 when the driver 502 rotates the plate 504. In a non-limiting embodiment, the rocker arm may be constructed from, for example, spring steel or some other applicable known or convenient material, and formed in such a way that it acts as an extension spring. Thus, when an actuator belt has high tension, the spring extends and the displacement of the belt is reduced. This may be advantageous in an embodiment in which automatic downshifting is desired.

In the example of FIG. 5, the sprocket 510 is coupled to the plate 506. The motion of the plate 506, when the driver 502 causes the plate 504 to rotate and the rocker arm 508 to rock back and forth, is depicted as a dashed line that passes through the center of the sprocket 510. The net motion is an oval path where the Y direction first changes quickly then slows as the motion is more in the X direction. Finally there is a quick return from the maximum Y displacement back to the minimum Y displacement.

In a non-limiting embodiment, the sprocket 510 is coupled to the plate 506 at the sprocket center 522, and is capable of rotating as it deflects an actuator belt (not shown) engaged by the sprocket 510. The term "sprocket" implies that the actuator belt is a chain. However, alternatively, the sprocket 510 can be replaced with any applicable deflector, which may or may not rotate around the center.

Figure 6:
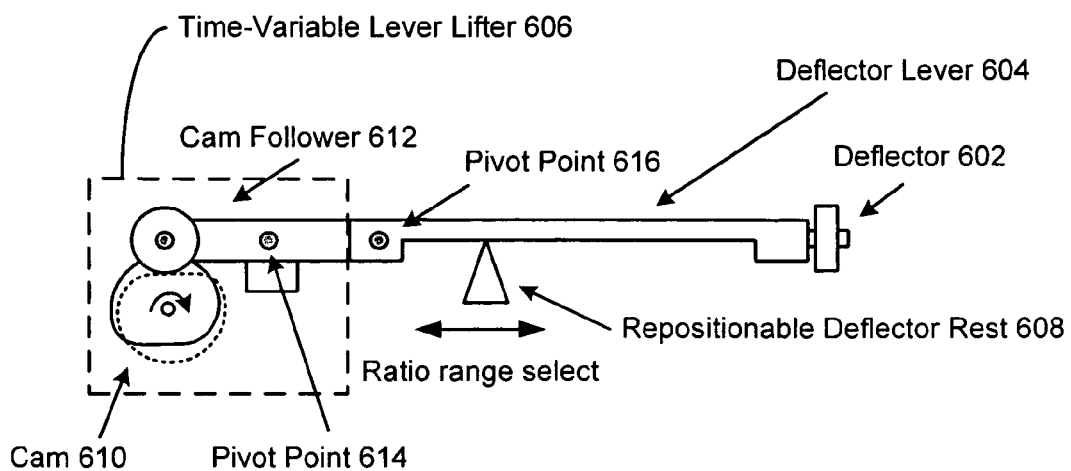
FIG. 6 shows a cam follower mechanism for deflecting a belt.

FIG. 6 depicts a deflection device 600 including a cam follower mechanism. The device 600 includes a deflector 602, a deflector lever 604, a time-variable lever lifter 606, and a repositionable deflector rest 608. In the example of FIG. 6, the deflector 602 includes a cable deflector pulley. However, any applicable known or convenient mechanism that can be used to deflect an actuator belt could be used.

In the example of FIG. 6, the deflector 602 is coupled to the deflector lever 604. The deflector lever 604 may include, by way of example but not limitation, spring steel that deflects to a lower ratio under a heavy load. However, any applicable known or convenient component that is capable of coupling the time-variable lever lifter 606 to the deflector 602 as described herein could be used.

In the example of FIG. 6, the time-variable lever lifter 606 includes a cam device. In an illustrative embodiment, the time-variable lever lifter 606 includes a cam 610 and a cam follower 612. In this illustrative embodiment, the amount of lift provided by the time-variable lever lifter 606 is at least partially dependent upon the position of the cam 610. In the example of FIG. 6, the cam 610 is positioned at a maximum lift position, which results in the deflector lever 604 being pulled down at one end by the cam follower 612, while the end of the deflector lever 604 that is coupled to the deflector 602 is raised. In the example of FIG. 6, the cam 610 has a minimum lift position illustrated as a dotted line, which results in zero lift (though in an alternative embodiment, there could be some lift). When the cam 610 rotates, the cam follower 612 moves up and down at a pivot point 614. Since the cam follower 612 is connected to one end of the deflector lever 604, the deflector lever 604 is pulled up and down in a similar (opposite) manner. In an illustrative embodiment, the pivot point 614 is a rotation point fixed relative to a housing (not shown), while pivot point 616 is a movable pivot point that couples the cam arm to the deflector arm. When the cam forces the left end of the cam arm upward, the right end of the cam arm moves down, moving pivot point 616 down. The downward motion of the pivot point 616 lowers the left end of deflector lever 604 and raises the right end of deflector lever 604. The amount of upward motion of the right end of deflector lever 604 varies depending on the position of repositionable deflector rest 608.

The amount of distance the deflector 602 actually travels is dependent upon a ratio range select, illustrated in FIG. 6 as a double-ended arrow near the repositionable deflector rest 608 because the repositionable deflector rest 608 is juxtaposed with the deflector lever 604 at a juxtaposition point. In operation, the deflector 602 is raised by the time-variable lever lifter 606 to a degree that is at least partially dependent upon the position of the juxtaposition point. As the juxtaposition point moves to the right, the deflector 602 has less maximum displacement on each cycle. In another embodiment, the deflector lever 604 may be designed with spring steel to provide and automatic mechanism to reduce the displacement as the load increases.

Figure 7A:
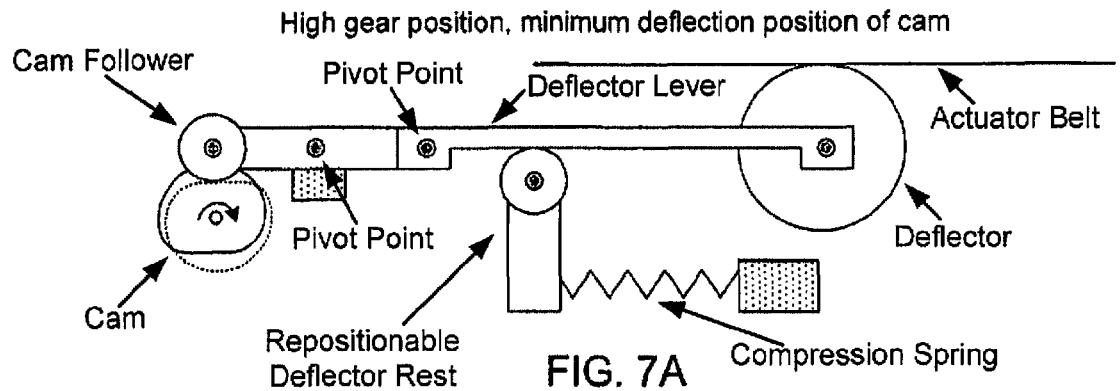
FIGS. 7A, 7B, 7C, 7D, and 7E show examples of externally controllable mechanisms for setting the ratio of a variable ratio actuator, generator or transmission.
Figure 7B:
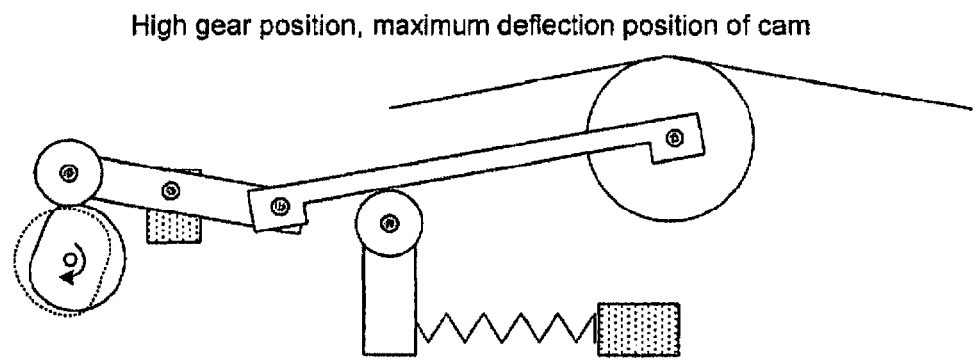
Figure 7C:
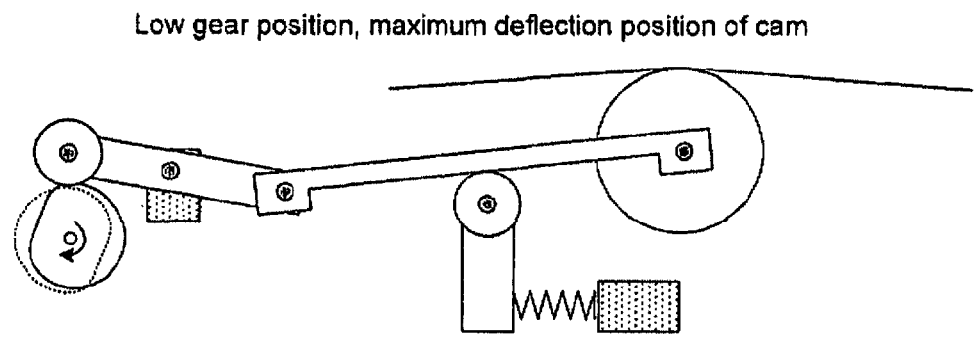

FIGS. 7A, 7B, and 7C show an externally controllable mechanism for setting the ratio of a variable ratio actuator, generator or transmission. The components of FIGS. 7A, 7B, and 7C are similar to those of FIG. 6, but the repositionable deflector rest 608 (FIG. 6) is shown in a bit more detail for the alternative embodiment depicted by FIGS. 7A, 7B, and 7C. FIGS. 7A, 7B, and 7C are intended to illustrate a repositionable deflector rest connected to a compression spring to allow for automatic ratio adjustment. FIG. 7A shows the minimum cam position where an actuator belt is tangent to the deflector sprocket regardless of the juxtaposition point setting. FIG. 7B shows the maximum deflection for a high gear setting, and FIG. 7C shows the maximum deflection for a lower gear setting.

Figure 7D:
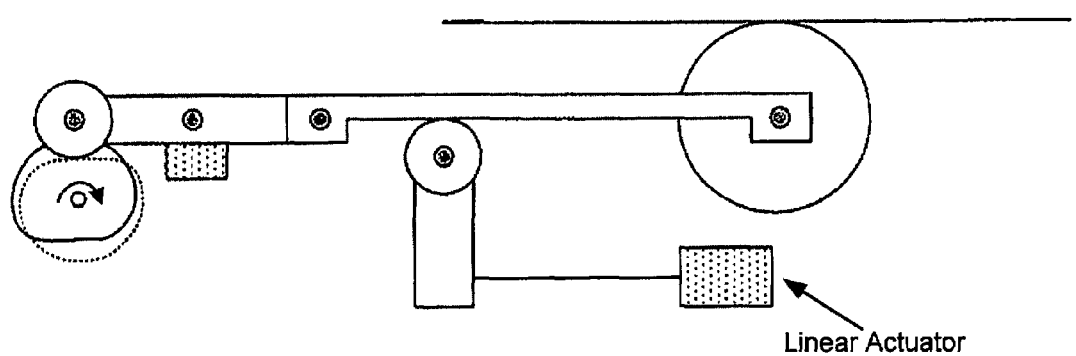
Figure 7E:
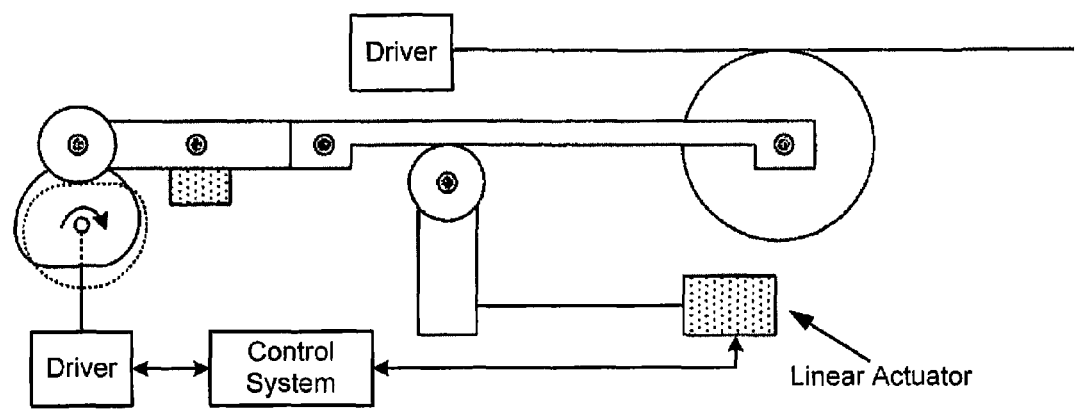

In an alternative embodiment, the repositionable deflector rest could be controlled by a linear actuator such as a worm motor, hydraulic actuator, or a manually operated mechanism (e.g., FIG. 7D). In cases where an actuator controls the position of the repositionable deflector rest, a control system can precisely set a desired ratio by measuring the rotation speed of the driver and the output to compute the current ratio (e.g., FIG. 7E). When the current ratio is less than the desired ratio, the juxtaposition point is moved left, and when it is more than desired, the juxtaposition point is moved right.

Figure 8A:
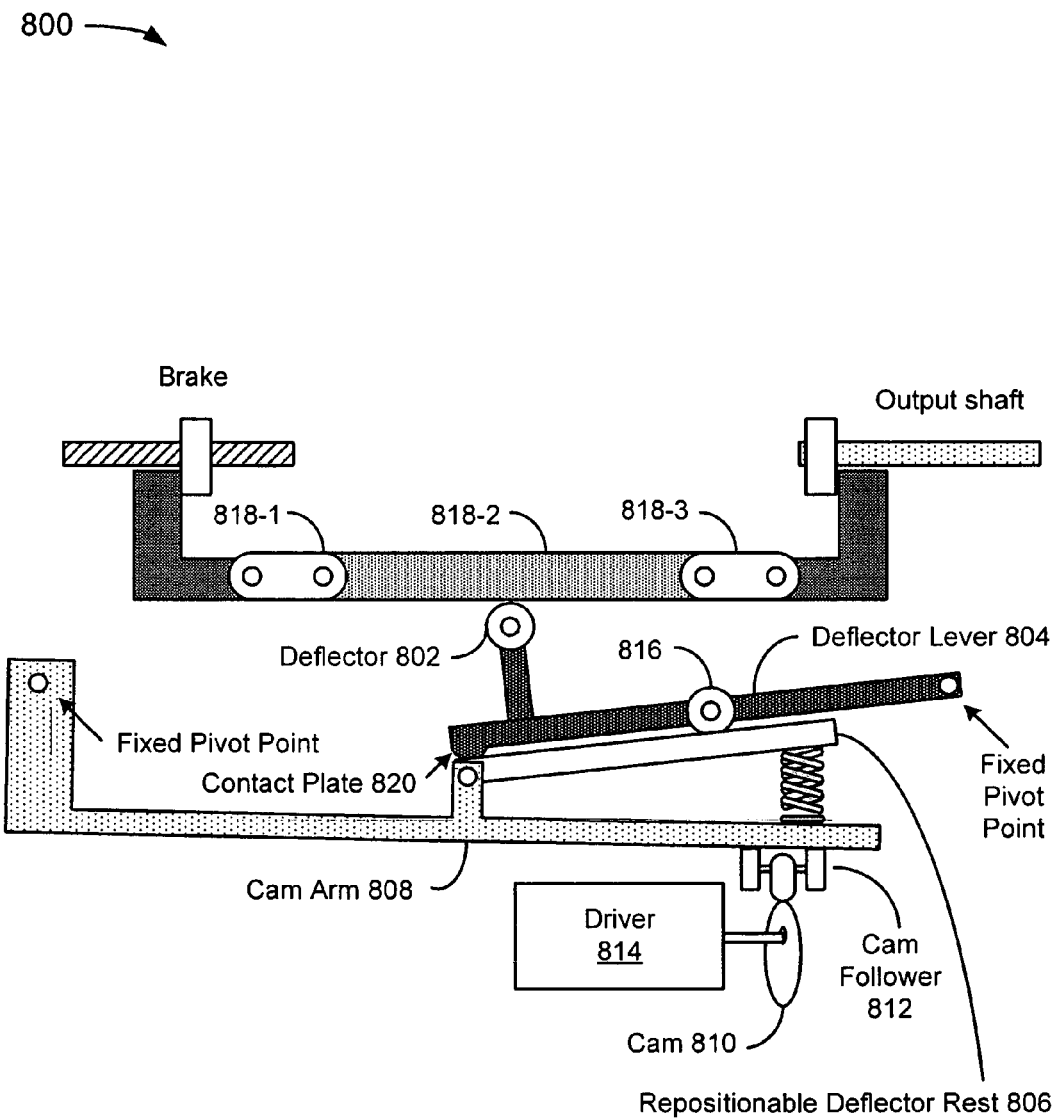
FIGS. 8A, 8B, and 8C depict an example of a variable ratio deflector system.
Figure 8B:
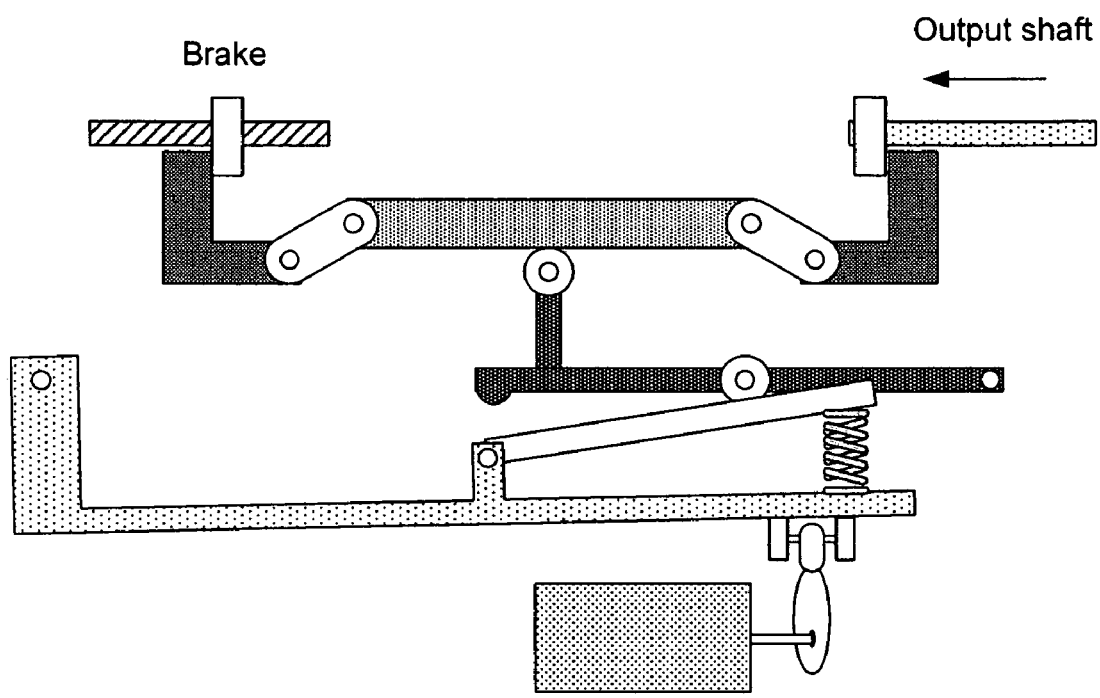
Figure 8C:
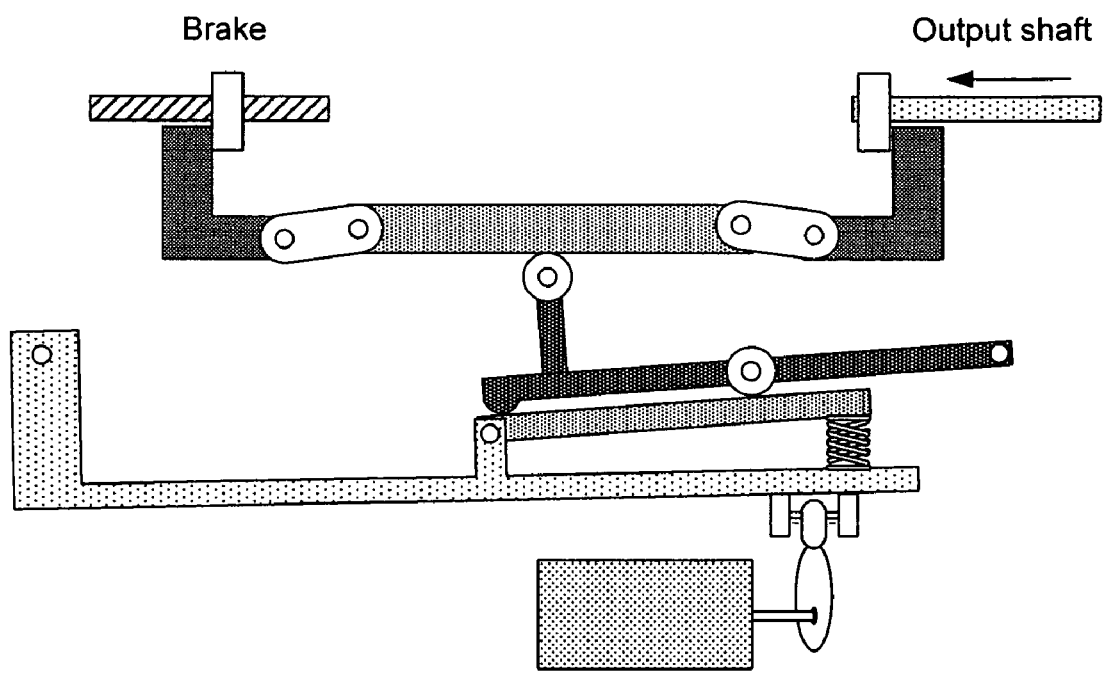

FIGS. 8A, 8B, and 8C depict an example of a variable ratio deflector system 800. The system 800 includes a deflector 802, a deflector lever 804, a repositionable deflector rest 806, a cam arm 808, a cam 810, a cam follower 812, and a driver 814. A juxtaposition point is identified by the reference number 816. In the example of FIGS. 8A, 8B, and 8C, a three link actuator belt is depicted as three links 818-1, 818-2, and 818-2, referred to collectively as the actuator belt 818.

A system such as is shown in the example of FIGS. 8A, 8B, and 8C may be suitable for deflecting a belt, chain or linkage as part of a variable ratio transmission or actuator. FIGS. 8A, 8B, and 8C show how the driver 814 rotates the cam 810, causing the cam arm 808 coupled to the cam follower 812 to rise. The cam arm 808, cam 810, cam follower 812, and driver 814 may be referred to collectively as a time-variable lever lifter.

The time-variable lever lifter pushes at the end of a spring that is part of the repositionable deflector rest 806 to move a track that is also a part of the repositionable deflector rest 806. It may be noted that in the system 800 the repositionable deflector rest 806 is positioned between the time-variable lever lifter and the deflector lever 804.

The repositionable deflector rest 806 pushes on the deflector lever 804 at the juxtaposition point 816. In an illustrative embodiment, the juxtaposition point 816 may include a roller coupled to the deflector lever 804. In alternative embodiments, the juxtaposition point 816 could be any other component (or lack thereof) that is interposed between the repositionable deflector rest 806 and the deflector lever 804, and may be considered a part of the deflector lever 804 and/or repositionable deflector rest 806.

The deflector lever 804 pushes the deflector 802 against the actuator belt 818. In an illustrative embodiment, the deflector 802 may include a roller. In an illustrative embodiment, two mechanisms such as just described are driven by out of phase cams 810 to drive two actuator belts 818.

In an illustrative embodiment, the deflector lever 804 may include a roller at the juxtaposition point 816 that rides on the repositionable deflector rest 806. When the load on the belt 818 is light or moderate, the spring deflects a small amount, deflecting the belt 818 as if the fulcrum (roller) had shifted to the left. Shifting the fulcrum to the left gives the cam arm 808 more mechanical advantage against the belt 818 and reduces the deflection of the belt 818.

In the example of FIG. 8A, at the left end of the deflector lever 804 is a contact plate 820 that limits the maximum spring compression and prevents the fulcrum from shifting farther left than this point. When the load is at its maximum, the contact plate 820 is in contact with the repositionable deflector rest 806 throughout the entire deflection cycle as set by the rotation of the cam 810, as shown in FIGS. 8A and 8C. The height of the contact plate 820 sets the minimum amount of deflection of the belt 818 on each cycle and hence sets the lowest gear ratio of the actuator.

FIG. 8A depicts the variable ratio deflector assembly in a minimum deflection position. In the example of FIG. 8A, the cam is at a minimum position, and the belt is actually not deflected at all. Where the belt is not deflected at all, the minimum position may be referred to as a zero position. However, in some embodiments, the minimum position may not be zero (i.e., the belt may be deflected at least slightly).

FIG. 8B depicts the variable ratio deflector assembly in a high gear position. In the example of FIG. 8B, the cam is at a maximum position, and the belt is deflected a maximum amount. If a stiff resistance is encountered when attempting to move the output shaft, the spring compresses and each deflection moves the actuator belt 818 a shorter distance but with more force, effectively dropping the actuator into a lower gear.

FIG. 8C depicts the variable ratio deflector assembly in a low gear position. In the example of FIG. 8C, the cam is at a maximum position, as it was in FIG. 8B. However, the spring is compressed so there is relatively little belt deflection.

Figure 9A:
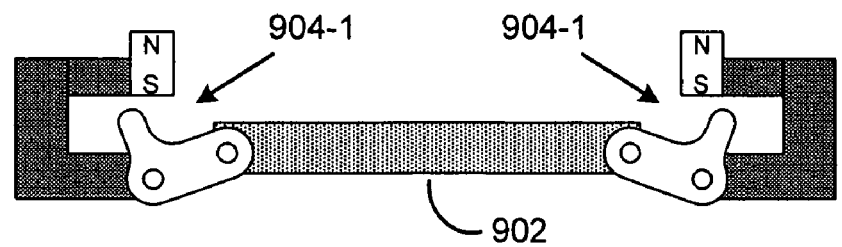
FIGS. 9A and 9B show a three-link belt with magnetic return mechanism.
Figure 9B:
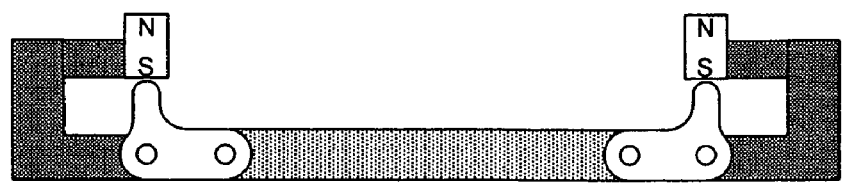

FIGS. 9A and 9B depict an example of a three-link actuator belt 902 with magnetic return mechanism 904-1, 904-2 (referred to collectively as the magnetic return mechanism 904). A three-link belt is advantageous in linear actuators because it can be made out of a strong material that stretches very little under load (e.g. steel), and because it can incorporate a magnet at each end to pull the belt flat.

FIG. 9A shows a magnetic return mechanism 904 starting position for pulling the belt 902 flat after each actuator cycle. FIG. 9B shows the magnetic return mechanism 904 pulling the belt 902 flat. In a deflection based actuator, it is advantageous to pull the belt 902 flat after every stroke. Pulling the belt flat with lead screw motors alone will never pull the belt perfectly flat because the force required becomes infinite (1/sin theta) as the belt approaches perfectly flat. However, the magnets can be placed such that their force increases as the belt 902 is nearly flat, and a relatively small magnet is required. The use of the magnetic return mechanism 904 can reduce the size of the lead screw motors required, and can allow for a lower gear possible than without this mechanism. If the belt 902 is not pulled as flat, then there may be too much slack in the belt 902 to allow it move the output shaft when the deflector mechanism is attempting to deflect the belt 902 by a very small amount (e.g., in very low gear).

Figure 10A:
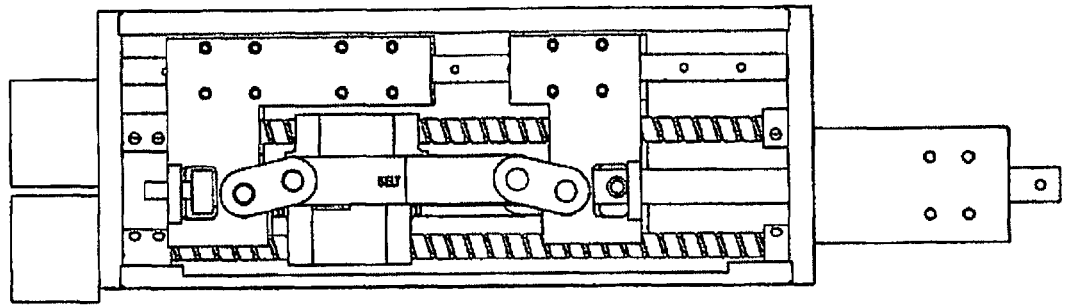
FIGS. 10A and 10B depict a complete bi-directional linear slider assembly including a variable ratio deflector mechanism.
Figure 10B:
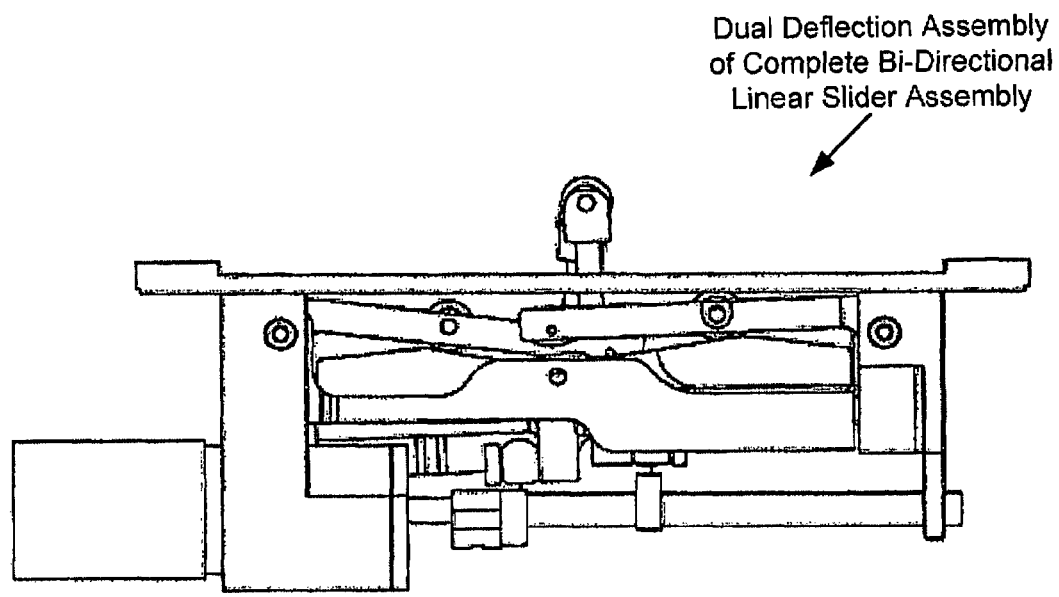

FIGS. 10A and 10B depict a complete bi-directional linear slider assembly including a variable ratio deflector mechanism. The examples of FIGS. 10A and 10B are intended to respectively illustrate complete actuator and deflector assemblies. FIG. 10A shows a complete slider assembly. Only the front belt and slider assembly is shown in this drawing. The front and back belt and slider assemblies operate similarly, but in an embodiment they are out of phase by 180 degrees.

In the example of FIG. 10A, a belt connects left and right belt holders. A lead screw brake engages one of the belt holders to stop its movement. The other belt holder engages a pin connected to the output shaft. When the belt is deflected, the belt pulls the output load. By setting the brake to stop the other belt holder, a belt deflection pulls the output in the opposite direction.

FIG. 10B shows a dual deflection assembly suitable for deflecting the belt in FIG. 10A. When operationally assembled, the top of the deflector assembly of FIG. 10B couples to the bottom of the actuator of FIG. 10A with the deflector roller pushing on the belt. The operation of the dual deflection assembly is similar to that described previously with reference to FIG. 8.

The invention is not limited to the specific embodiments described. The materials used in construction are not limited to the ones described. In an embodiment, the ratio adjusting mechanism allows for an external control to set the desired ratio via mechanical, electrical, hydraulic or other means for adjusting the pivot point of a cam follower mechanism or other applicable device.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
an actuator belt;
a deflector for deflecting the actuator belt;
a deflector lever coupled to the deflector;
a lift lever coupled to the deflector lever, the lift lever having a fixed fulcrum between a first end and a second end of the lift lever, the second end of the lift lever being operationally connected to the deflector lever;
a cam device coterminous with the first end of the lift lever, wherein the cam device comprises a cam located adjacent to the first end of the lift lever and a cam follower connected to the first end of the lift lever;
a repositionable deflector rest juxtaposed, in operation, with the deflector lever at a juxtaposition point;
wherein, in operation, the juxtaposition point changes during an increasing deflection period, wherein the deflector deflects an actuator belt that moves the load to a degree that is at least partially dependent upon the position of the juxtaposition point during at least a portion of the increasing deflection period;
wherein the juxtaposition point changes relative to the deflector lever.

2. The system of claim 1, wherein the deflector does not deflect the actuator belt during a zero deflection period.

3. The system of claim 1, wherein the deflector deflects the actuator belt that moves the load to a degree that is at least partially dependent upon the load.

4. The system of claim 1, wherein the repositionable deflector rest includes a fulcrum, and wherein the juxtaposition point is a fulcrum point.

5. The system of claim 1, wherein the repositionable deflector rest includes a roller that, in operation, is coterminous with the deflector lever.

6. The system of claim 1, wherein the repositionable deflector rest includes a roller that is operationally connected to the deflector lever.

7. The system of claim 1, wherein:
the deflector lever includes a first end and a second end;
the juxtaposition point is between the first end and the second end;
the deflector is operationally connected to the second end.

8. The system of claim 1, wherein the increasing deflection period is associated with the lift lever lifter exerting force in a first direction on a first end of the deflector lever thereby causing the deflector, operationally connected to a second end of the deflector lever, to exert force in a second direction on the actuator belt.

9. The system of claim 1, further comprising:
a motor for driving the cam such that the first end of the lift lever rises when the second end of the lift lever falls and the second end of the lift lever rises when the first end of the lift lever falls.

* * * * *